(12) United States Patent
Hsu et al.

(10) Patent No.: US 10,838,370 B2
(45) Date of Patent: Nov. 17, 2020

(54) LASER PROJECTION CLOCK

(71) Applicants: Chia Wei Hsu, New Taipei (TW); Chia Chi Hsu, New Taipei (TW)

(72) Inventors: Chia Wei Hsu, New Taipei (TW); Chia Chi Hsu, New Taipei (TW)

(*) Notice: Subject to any disclaimer, the term of this patent is extended or adjusted under 35 U.S.C. 154(b) by 113 days.

(21) Appl. No.: 15/863,134

(22) Filed: Jan. 5, 2018

(65) Prior Publication Data
US 2019/0137941 A1     May 9, 2019

(30) Foreign Application Priority Data

Nov. 6, 2017   (TW) .............................. 106138334 A

(51) Int. Cl.
| | |
|---|---|
| *G04G 9/00* | (2006.01) |
| *G04B 19/04* | (2006.01) |
| *G03B 21/20* | (2006.01) |
| *G04C 17/00* | (2006.01) |
| *G04B 19/34* | (2006.01) |
| *G03B 29/00* | (2006.01) |
| *G04B 19/06* | (2006.01) |

(52) U.S. Cl.
CPC ........... *G04G 9/00* (2013.01); *G03B 21/2033* (2013.01); *G03B 29/00* (2013.01); *G04B 19/04* (2013.01); *G04B 19/34* (2013.01); *G04C 17/00* (2013.01); *G04B 19/06* (2013.01)

(58) Field of Classification Search
CPC ........ G04G 9/00; G04G 9/0023; G04B 19/04; G04B 19/34; G04B 19/06; G03B 21/2033; G03B 19/34; G03B 29/00; G04C 17/00
See application file for complete search history.

(56) References Cited

U.S. PATENT DOCUMENTS

| | | | | |
|---|---|---|---|---|
| 2,009,209 A | * | 7/1935 | Scantlebury | G04B 19/30 362/23.15 |
| 3,490,226 A | * | 1/1970 | Anderson | G04B 19/30 368/67 |
| 4,461,581 A | * | 7/1984 | Simon | G04C 17/02 368/79 |
| 4,761,715 A | * | 8/1988 | Brooks | G01D 5/285 116/286 |
| 5,247,491 A | * | 9/1993 | Kwiatkowski | F21V 5/00 359/615 |

(Continued)

*Primary Examiner* — Sean Kayes
(74) *Attorney, Agent, or Firm* — Muncy, Geissler, Olds & Lowe, P.C.

(57) ABSTRACT

The present invention provides a laser projection clock, comprising a driving device, one or a plurality of pointer light source device, and one or a plurality of grating. The driving device comprises one or a plurality of rotating shafts and power elements for driving the one or plurality of the rotating shafts to rotate at different speeds respectively. The one or plurality of pointer light source devices is configured on one side of the driving device to each output a laser beam. The one or plurality of gratings is configured on the one or a plurality of rotating shafts in a one-on-one manner in order to be rotated by the one or plurality of rotating shafts respectively. The grating has an indication pattern, and the one or plurality of laser beams are projected to a projection plane through the one or a plurality of indication patterns of the one or plurality of gratings to form one or plurality of laser indications respectively.

9 Claims, 12 Drawing Sheets

(56) References Cited

U.S. PATENT DOCUMENTS

| | | | | |
|---|---|---|---|---|
| 5,247,492 A * | 9/1993 | Pan | G04G 9/00 | 368/239 |
| 5,584,569 A * | 12/1996 | Huang | F41G 1/545 | 362/110 |
| 6,160,767 A * | 12/2000 | Ho | G04B 19/34 | 368/227 |
| 6,219,306 B1 * | 4/2001 | Kwiatkowski | G04B 19/34 | 353/46 |
| 6,295,753 B1 * | 10/2001 | Thummel | F41A 33/02 | 42/116 |
| 6,317,226 B1 * | 11/2001 | Yeh | G02B 27/60 | 283/72 |
| 6,430,823 B1 * | 8/2002 | Seki | G01C 15/004 | 33/281 |
| 6,502,757 B1 * | 1/2003 | Iwamoto | B82Y 10/00 | 235/457 |
| 6,882,597 B2 * | 4/2005 | Kent | G04G 9/00 | 368/223 |
| 7,252,394 B1 * | 8/2007 | Fu | G03B 21/28 | 348/E9.026 |
| 7,388,813 B2 * | 6/2008 | Su | G04B 19/34 | 362/231 |
| 7,872,950 B1 * | 1/2011 | Su | G04G 9/04 | 368/223 |
| 8,593,912 B1 * | 11/2013 | Amores | G04G 13/026 | 368/239 |
| 9,063,270 B2 * | 6/2015 | Lin | F21V 9/14 | |
| 9,971,399 B2 * | 5/2018 | Lee | G04G 9/0064 | |
| 2002/0154349 A1 * | 10/2002 | Halldorsson | B60K 35/00 | 359/15 |
| 2009/0279169 A1 * | 11/2009 | Hoult | G02B 21/0028 | 359/385 |
| 2012/0106310 A1 * | 5/2012 | Shinoda | G11B 7/094 | 369/109.01 |
| 2012/0162960 A1 * | 6/2012 | Lin | G02B 5/0242 | 362/19 |
| 2016/0124500 A1 * | 5/2016 | Lee | G04G 9/0064 | 345/156 |
| 2018/0003462 A1 * | 1/2018 | Chavez | F41G 1/345 | |
| 2018/0232087 A1 * | 8/2018 | Wu | G06F 3/0421 | |

* cited by examiner

LASER PROJECTION CLOCK

BACKGROUND OF THE INVENTION

1. Technical Field

The present invention relates to a clock and more particularly to a laser projection clock that projects a laser beam through a grating to form the image of a clock.

2. Description of Related Art

Time is precious to humans because the former goes by without returning and the latter have only limited life spans. Various timing instruments, therefore, have been developed since antiquity in order to tell time with precision and enable efficient time management.

Water clocks and hourglasses, for example, were used in the distant past to measure time with flowing water or sand. Serving the same purpose back then, sundials exploited the variation of shadow while oil-lamp clocks told time through the amount of the oil burned. Afterward, the modern era saw the development of pendulum clocks, quartz clocks, atomic clocks, and so on, which are either mechanical or electrical to help foster a proper sense of time, urging people to allocate time sensibly and make the best of every moment.

Today, clocks are typically provided with physical pointers, or hands, and a clock face, or dial, printed or engraved with numbers or graduation marks that represent time. The manufacture and arrangement of clock components, however, make it difficult to produce a clock with a large dial, and physical clocks of common specifications tend to lack a wow factor in appearance. For people who are constantly in pursuit of modernity and changes, these issues definitely leave room for improvement. The inventor of the present invention, therefore, considered it necessary to design a highly creative clock that can stand out from its ordinary counterparts.

BRIEF SUMMARY OF THE INVENTION

The primary objective of the present invention is to solve the prior art problem that diverse variations of clock sizes can be hard to achieve.

To address the above problem, the present invention provides a laser projection clock, comprising a driving device, one or a plurality of pointer light source devices, and one or a plurality of gratings. The driving device comprises one or a plurality of rotating shafts and a power element for driving the one or plurality of the rotating shafts to rotate at different speeds respectively. The one or plurality of pointer light source devices is configured on one side of the driving device to each output a laser beam. The one or plurality of gratings is configured on the one or a plurality of rotating shafts in a one-on-one manner in order to be rotated by the one or plurality of rotating shafts respectively. The grating has an indication pattern, and the one or plurality of laser beams are projected to a projection plane through the one or a plurality of indication patterns of the one or plurality of gratings to form one or plurality of laser indications respectively.

Further, the grating is a diffraction optical element or hologram.

Further, the plurality of pointer light source devices tilt toward one side so that the projected laser indications converge at one same point on the projection plane.

Further, the pointer light source device comprises a laser output unit and a tilt adjustment unit configured on one side of the laser output unit.

Further, the tilt adjustment unit comprises a X-axis fine-tuning unit, a Y-axis fine-tuning unit, and one or a plurality of elastic elements configured opposite, and corresponding to an intermediate position between, the X-axis fine-tuning unit and the Y-axis fine-tuning unit; wherein, the X-axis fine-tuning unit is configured on a first side of the laser output unit, the Y-axis fine-tuning unit is configured on a second side of laser output unit forming an included angle with the first side, and the X-axis fine-tuning unit and the Y-axis fine-tuning unit are configured for pressing the elastic element indirectly and from different sides respectively, so as to adjust the laser output unit.

Further, the X-axis fine-tuning unit comprises a rail with an internally threaded portion and a threaded locking unit threadedly coupled to the internally threaded portion; wherein, the threaded locking unit can be moved along the rail to one end of the rail in order to press the elastic element on the opposite side of the laser output unit and thereby adjust a tilt angle of the laser output unit in the X-axis direction.

Further, the Y-axis fine-tuning unit comprises a rail with an internally threaded portion and a threaded locking unit threadedly coupled to the internally threaded portion; wherein, the threaded locking unit can be moved along the rail to one end of the rail in order to press the elastic element/elements on the opposite side of the laser output unit and thereby adjust a tilt angle of the corresponding laser output unit in the Y-axis direction.

Further, the laser projection clock comprises a dial light source device and a fixed grating configured on one side of the dial light source device; wherein, the laser beam of the dial light source device is projected through the fixed grating to a projection plane on the dial light source device to form a clock dial pattern.

Further, the fixed grating has a plurality of annularly arranged identification patterns; and, the annularly arranged identification patterns comprise words, numbers, or patterns that make up the dial of a clock.

Further, the driving device is one or a plurality of mechanical movements or quartz movements.

Comparing with the conventional techniques, the present invention provides the following advantages:

1. The gratings of the present invention are provided on different rotating shafts and are rotated at different speeds respectively, and the pointer light source device are configured on one side of the gratings to output laser beams that pass through the gratings to form laser indications of the hour, the minute, and the second respectively, thereby producing a novel visual effect different from those of common clocks.

2. The present invention also provides tilt adjustment units for adjusting the laser beams so that the end of the laser indications can converge at point or be separate from one another as desired.

3. The present invention further provides a dial light source device and a fixed grating in order to form a projected virtual dial on which the laser indications can be projected to indicate time.

BRIEF DESCRIPTION OF THE SEVERAL VIEWS OF THE DRAWINGS

FIG. 11-1 is the schematic diagram of the laser projection clock of the present invention during another operation I.

FIG. 11-2 is the schematic diagram of the laser projection clock of the present invention during another operation II.

DETAILED DESCRIPTION OF THE INVENTION

The details and technical solution of the present invention are hereunder described with reference to accompanying drawings. For illustrative sake, the accompanying drawings are not drawn to scale. The accompanying drawings and the scale thereof are restrictive of the present invention.

The technical features of the present invention are described below by way of certain preferred embodiments. To begin with, reference is made to FIG. 1 and FIG. 2, which show partially see-through perspective views of a laser projection clock according to the invention that are taken from different viewing angles respectively.

Figure 1:
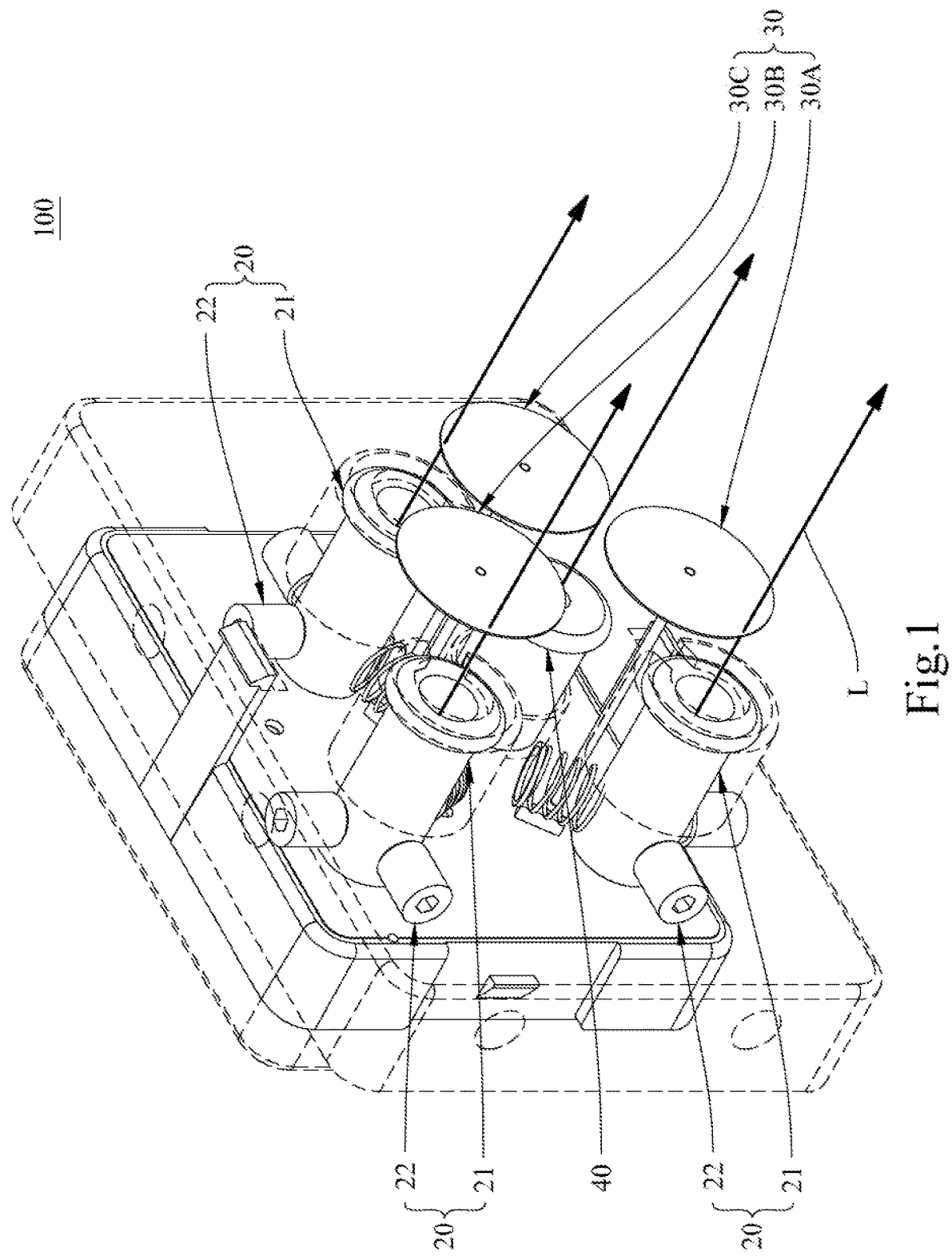
FIG. 1 is the partial perspective view of the laser projection clock of the present invention.
Figure 2:
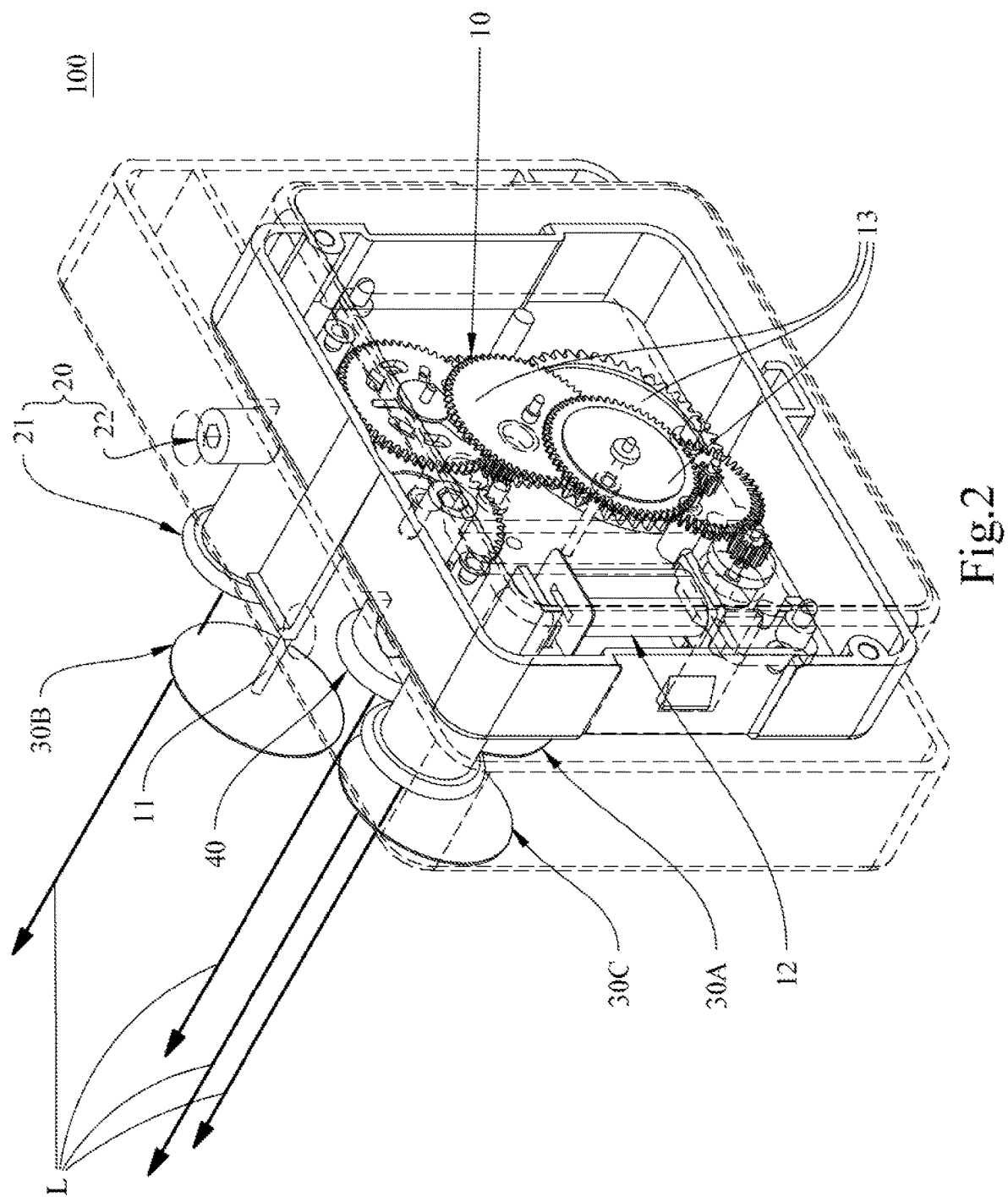
FIG. 2 is the partial perspective view from another side of the laser projection clock of the present invention.

The present invention discloses a laser projection clock 100 as shown in FIG. 1 and FIG. 2. The laser projection clock 100 comprises a driving device 10, one or a plurality of pointer light source devices 20, and one or a plurality of gratings 30. The laser projection clock 100 projects one or a plurality of laser beams L that pass through the gratings 30 respectively so that the patterns on the gratings 30 can be projected as far as the laser beams L can reach to show the time wherever desired, be it a wall of a building or any other object at an intended location or in an intended space.

The driving device 10 comprises one or a plurality of rotating shafts 11 and a power element 12 for driving the rotating shafts 11 to rotate at different speeds respectively. In one preferred embodiment, the rotating shafts 11 are configured at the shafts of one or a plurality of gears 13 respectively. In cases where a plurality of gears 13 are configured, the gears 13 mesh with one another and have different gear ratios respectively, and the power element 12 rotates the gears 13 in such a way that the rotating shafts 11 are rotated at different speeds respectively.

In one preferred embodiment, the driving device 10 is a mechanical movement and uses a winding mechanism as the power element 12 for rotating the gear 13. The mechanical movement further includes an escapement device and a balance wheel hairspring for adjusting the speed so that the rotating shafts 11 on gears 13 can rotate the gratings 30 stably. In another preferred embodiment, the driving device 10 is a quartz movement and uses a battery as the power element 12 for driving the gear/gears 13 into rotation. The quartz movement further includes a quartz oscillator, an integrated circuit board, and a stepper motor with windings. The stepper motor receives signals from the quartz oscillator through the integrated circuit board in order for the rotating shafts 11 on the gears 13 to rotate the gratings 30 stably. Please note that the type and structure of the power element 12 for rotating the rotating shafts 11 are not limited to those disclosed above. The power element 12 may be any device capable of rotating the rotating shafts 11 stably.

The pointer light source devices 20 are configured on one side of the driving device 10 and can each output a laser beam L. The one or plurality of gratings 30 are configured on the rotating one or plurality of shafts 11 respectively, i.e., in a one-on-one manner, so as to be rotated by the one or plurality of rotating shafts 11 respectively. In one preferred embodiment, the gratings 30 are diffraction optical elements. In another preferred embodiment, the gratings 30 are holograms, which are formed by photography to generate specific wave fields. As a hologram can reproduce complicated interference lines, a laser beam L incident on such a hologram undergoes diffraction.

Figure 3:
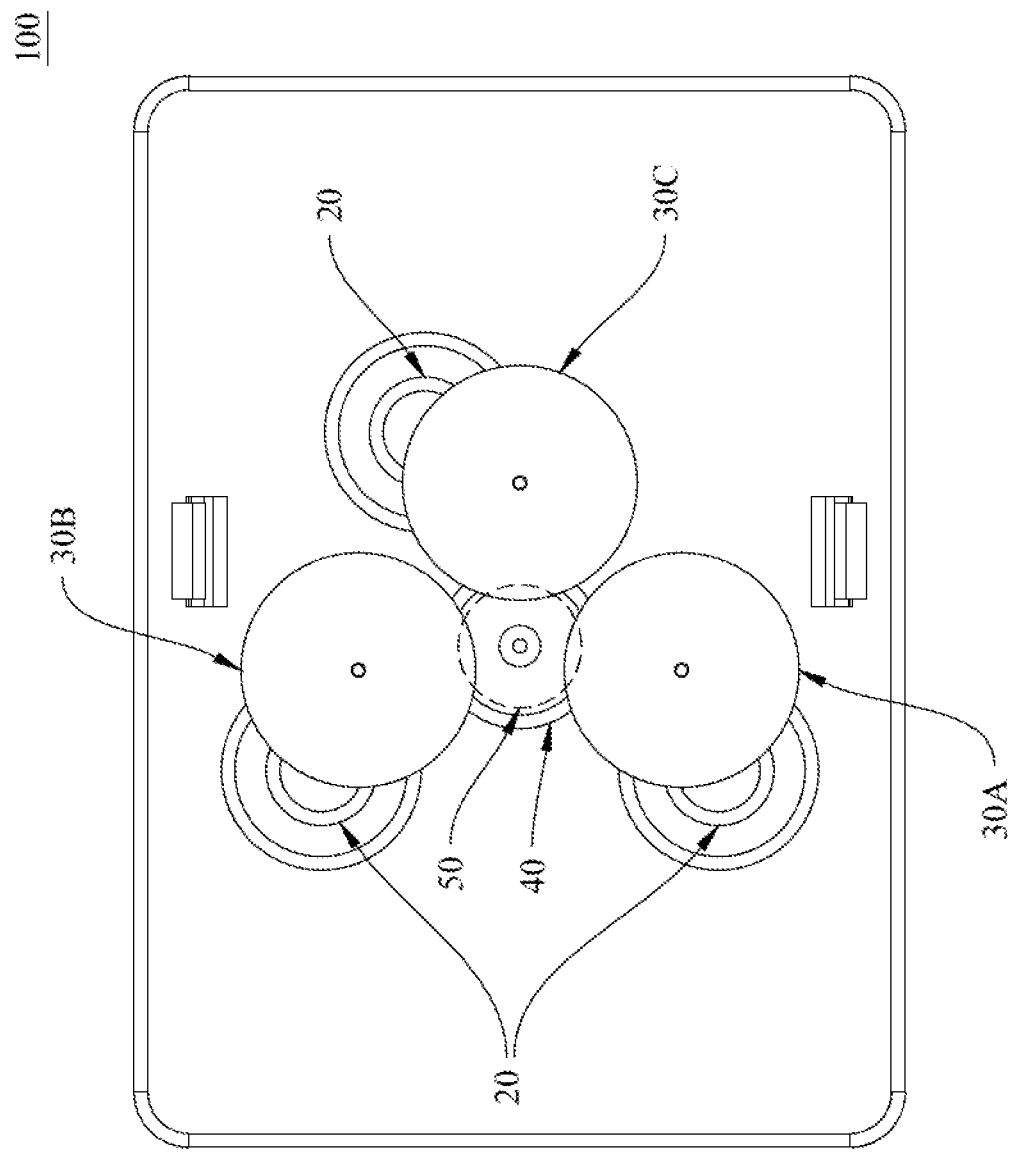
FIG. 3 is the top view of the laser projection clock of the present invention.

Referring to FIG. 3 in conjunction with FIGS. 1 and 2, the laser projection clock 100 comprises three pointer light source devices 20 and three gratings 30 (i.e., gratings 30A~30C) that correspond to the pointer light source devices 20 respectively. The gratings 30A~30C are configured for projecting laser indications of the hour, the minute, and the second respectively. It is worth mentioning that the present invention has no limitation on the number of the pointer light source device 20 or of the gratings 30. There may instead be two pointer light source device 20 and two gratings 30 (i.e., gratings 30A and 30B) that correspond to the pointer light source device 20 respectively and that are configured for projecting laser indications of the hour and the minute respectively. Moreover, the relationship between the gratings 30A~30C and the hour, the minute, and the second may vary according to design or manufacture requirements; the present invention imposes no limitation in this regard.

Figure 4:
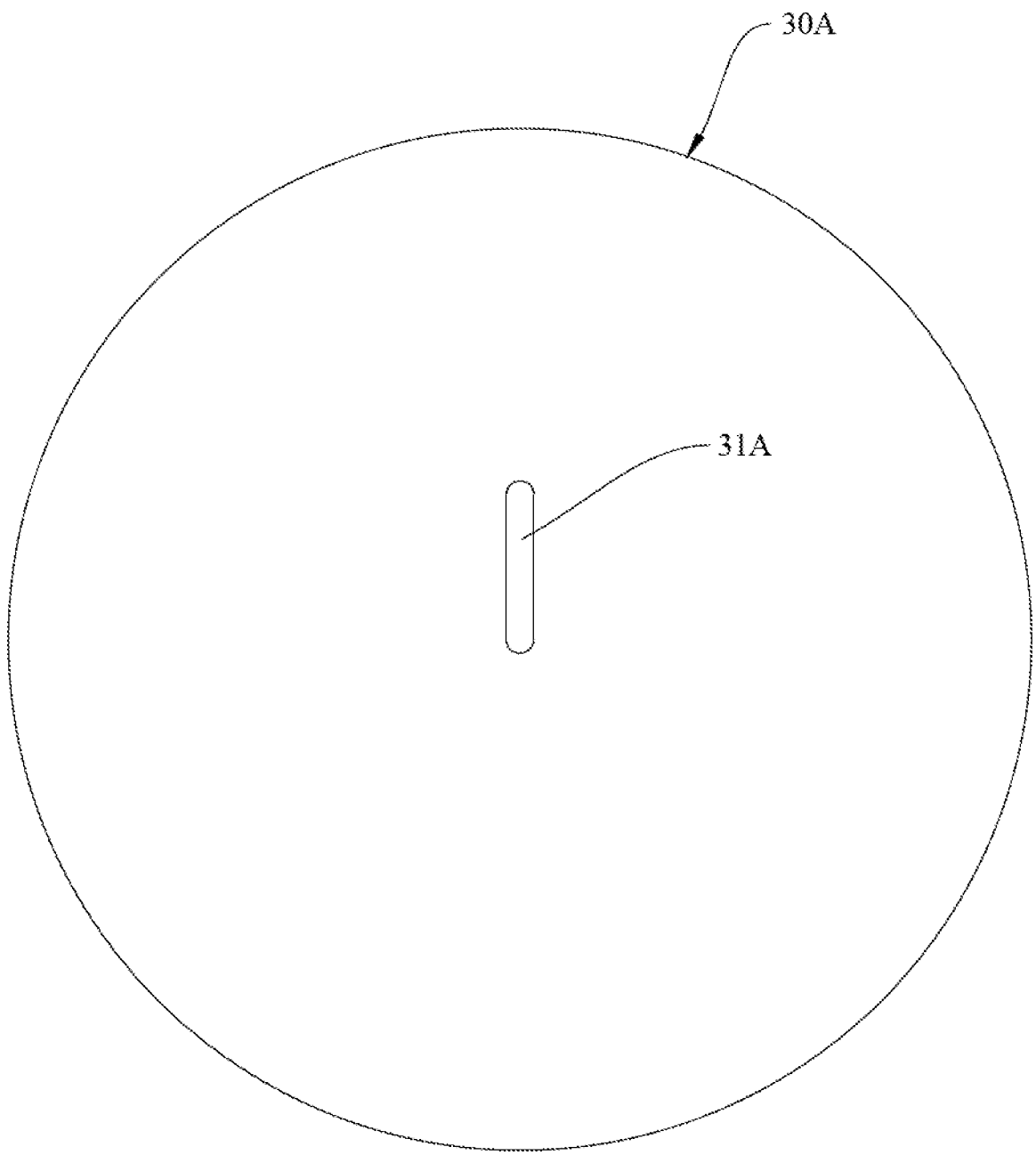
FIG. 4 is the outside view I of the grating of the present invention.
Figure 5:
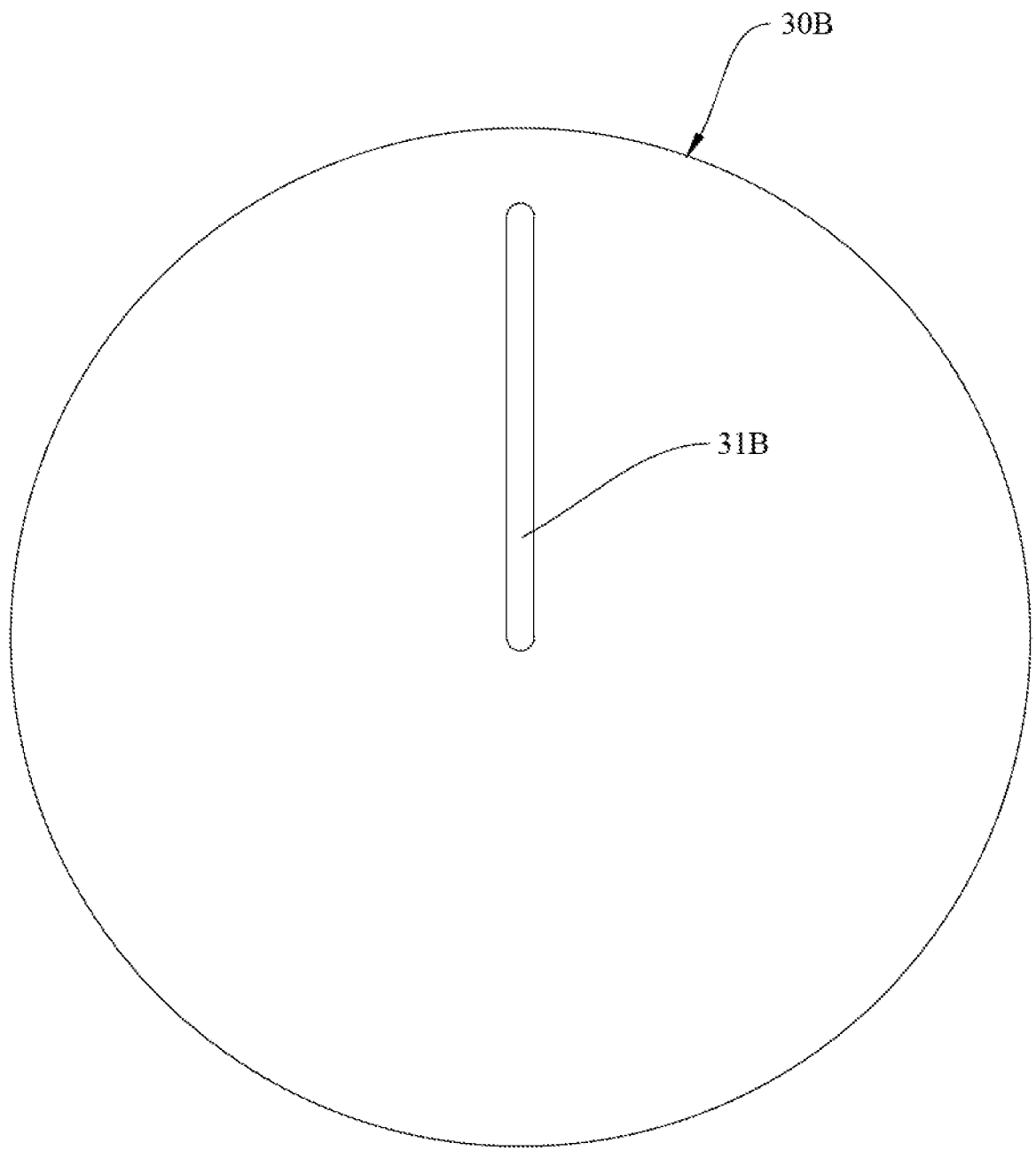
FIG. 5 is the outside view II of the grating of the present invention.
Figure 6:
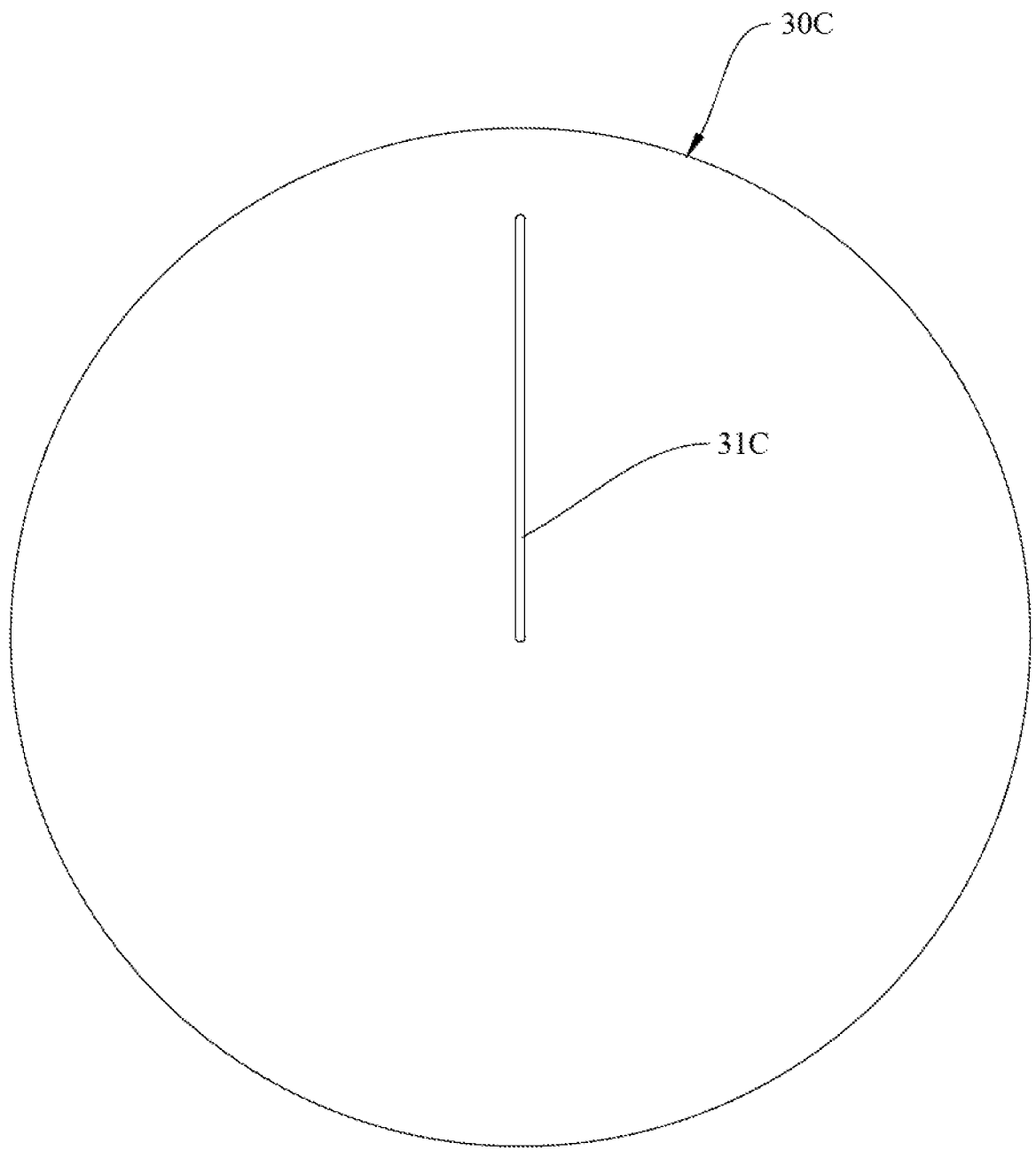
FIG. 6 is the outside view III of the grating of the present invention.
Figures 1, 11:
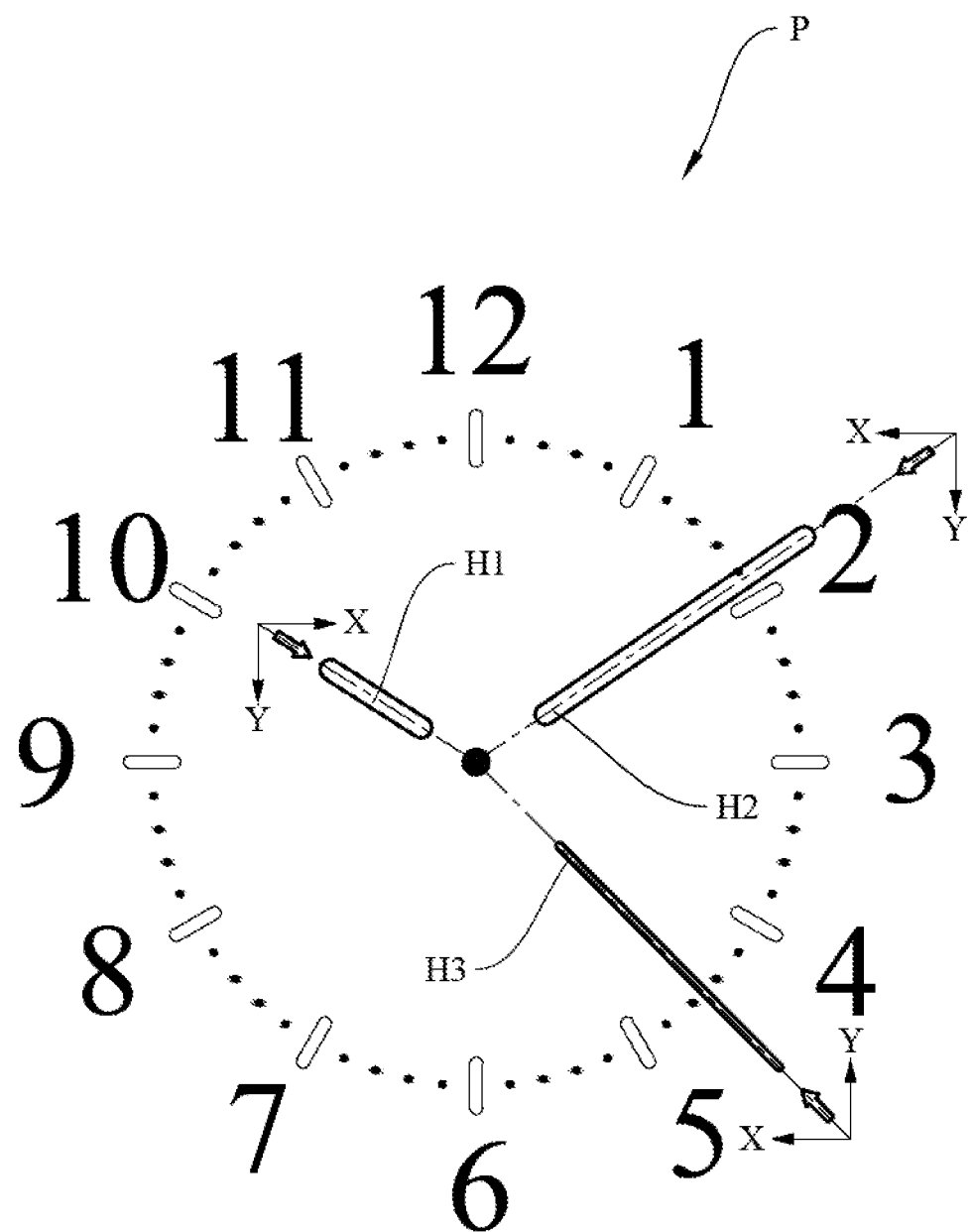
Figures 2, 11:
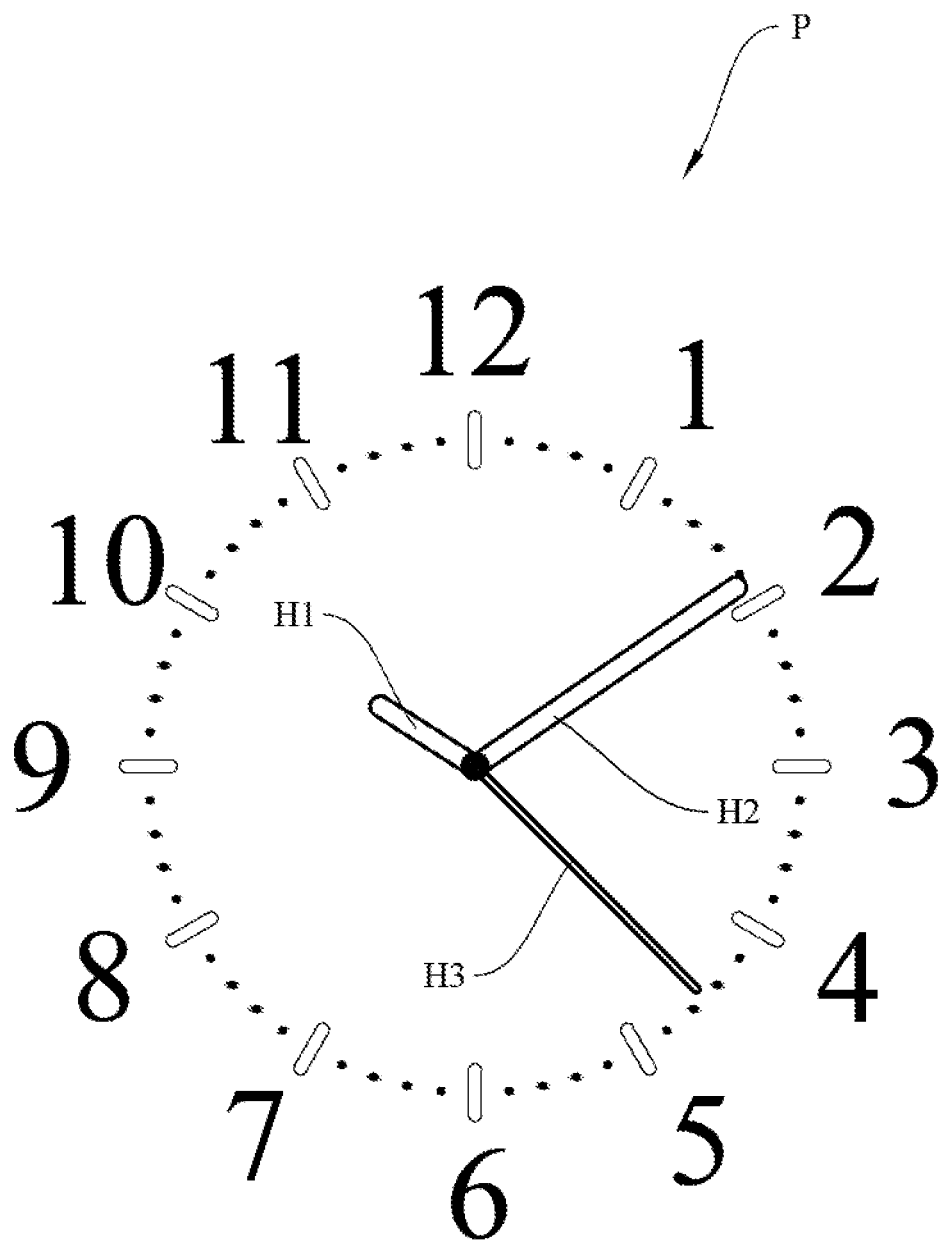

Each grating 30 has an indication pattern. The laser beam L of each pointer light source device 20 passes through the indication pattern of the corresponding grating 30 and is eventually projected on a projection plane P (as shown in FIG. 11-1) to form the corresponding laser indication. In a preferred embodiment as shown in FIGS. 4~6, the grating 30A has an indication pattern 31A for the hour hand, the grating 30B has an indication pattern 31B for the minute hand, and the grating 30C has an indication pattern 31C for the second hand, wherein all the indication patterns 31A~31C are strip-like. More specifically, the indication pattern 31A is shorter and wider than the indication pattern 31B, and the indication pattern 31C is generally as long as but narrower than the indication pattern 31B. The laser beams L are projected on the projection plane P through the gratings 30A~30C respectively to form laser indications of the hour, the minute, and the second respectively. Please note that the indication patterns 31A~31C in the present invention are not limited to those described above and may be other patterns that differ from one another in length, width, or shape in order for a user to distinguish the plural laser indications projected.

In one preferred embodiment, the projection plane P may be a sticker on a wall, a panel, the cover of an object, or the like in order to provide a physical clock face on which the plural laser indications can be projected. The physical clock face may have words, numbers, or patterns to which the laser indications can respond, thus forming a 12- or 24-hour dial. In another preferred embodiment, the projection plane P may be a virtual dial formed by projecting a light beam to a wall or curtain. Referring back to FIG. 3, the laser projection clock 100 further comprises a dial light source device 40 and a fixed grating 50 configured on one side of the dial light source device 40. The laser beam L of the dial light source device 40 is projected through the fixed grating 50 to a projection plane P on the aforesaid side of the dial light source device 40 to form clock dial pattern. Based on practical needs and the arrangement of the space where the laser projection clock 100 is used, the dial light source device 40 can be selectively turned on to project the clock dial pattern and turned off when projection of the clock dial pattern is not desired.

Figure 7:
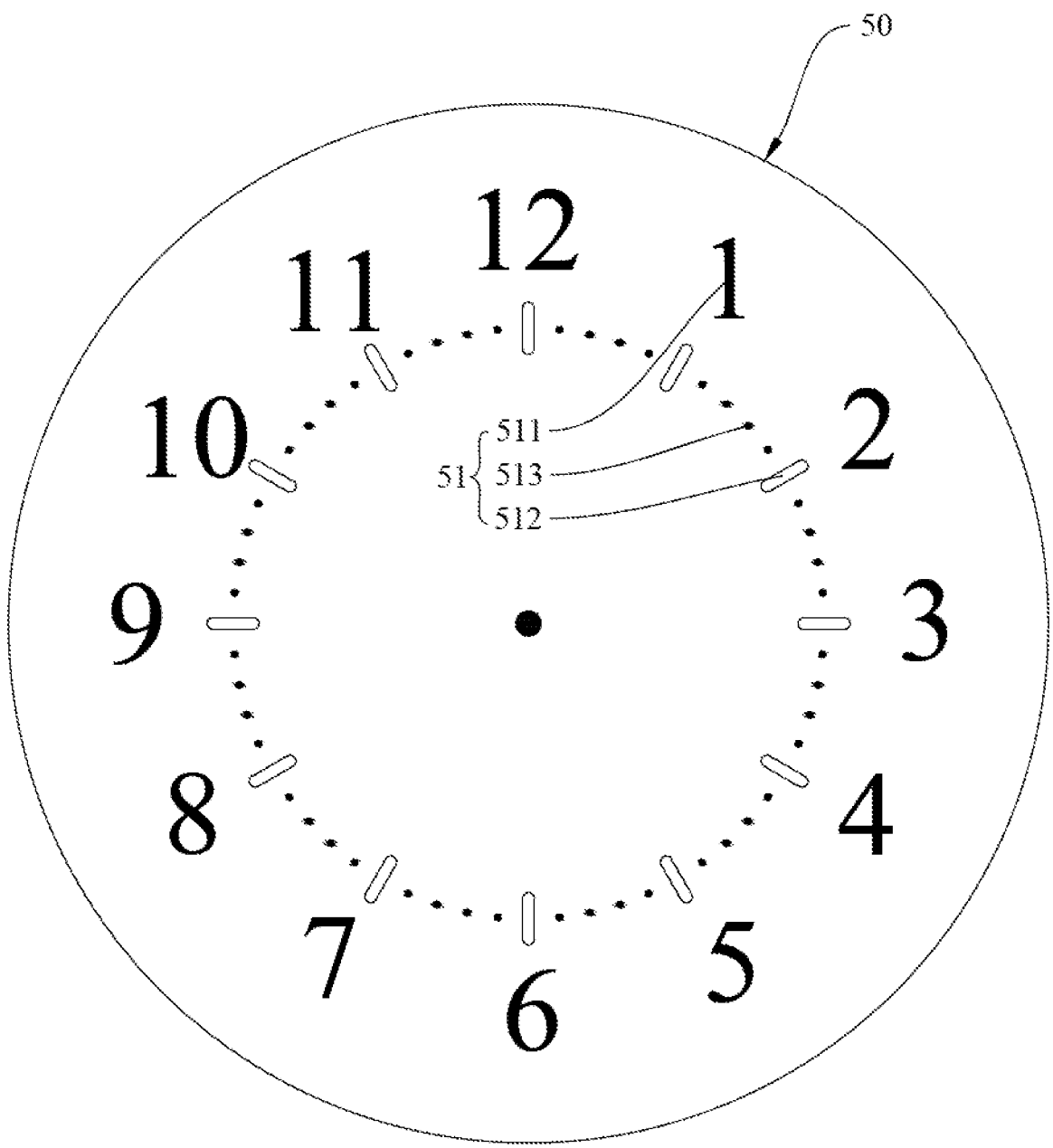
FIG. 7 is the outside view of the fixed grating of the present invention.

The fixed grating 50 has a plurality of annularly arranged identification patterns 51. The identification patterns 51 comprise words, numbers, or patterns that make up pattern or format of the clock dial pattern. In a preferred embodiment as shown in FIG. 7, the identification patterns 51 include a plurality of circularly arranged Arabic numbers 511 that increase clockwise. A strip-like pattern 512 is configured on one side of each Arabic number 511, and a plurality of circular dot patterns 513 are evenly distributed between each two adjacent strip-like patterns 512. The strip-like patterns 512 and the circular dot patterns 513 serve as the graduation marks on a clock dial. It is worth mentioning that the identification patterns 51 are not limited to the foregoing and may include only words, numbers, or identifiable patterns that enable determination of time.

Figure 8:
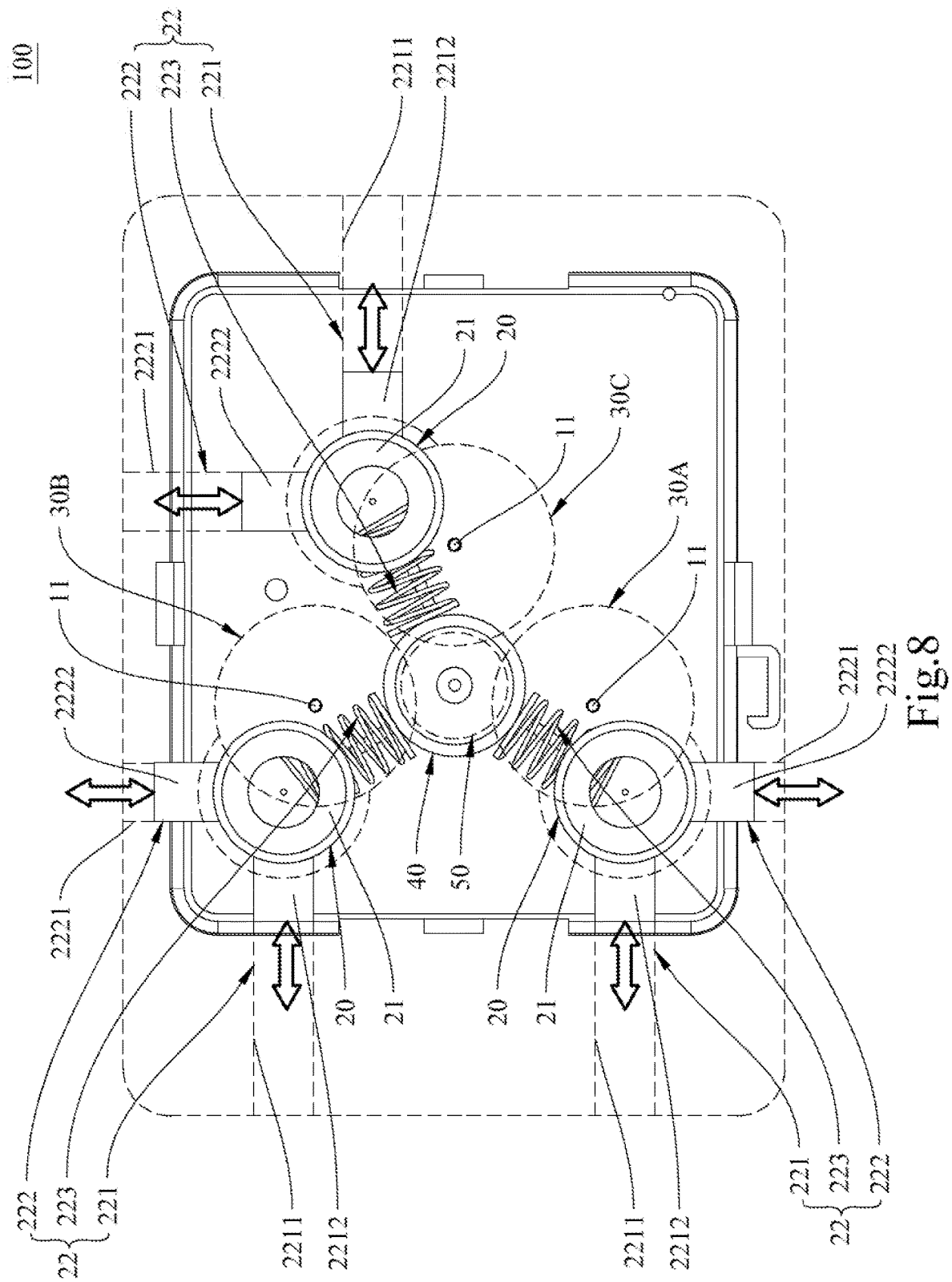
FIG. 8 is the top view of adjusting the laser beams by laser projection clock of the present invention.

In a preferred embodiment as shown in FIG. 8, each pointer light source device 20 comprises a laser output unit 21 and a tilt adjustment unit 22 configured on one side of the laser output unit 21. Each laser output unit 21 is configured for outputting a laser beam L. Each tilt adjustment unit 22 is configured for adjusting the output direction of the corresponding laser beam L so that at least one laser indications meet at one end, i.e., all the laser indications converge at one same point on the projection plane P. In another preferred embodiment, the pointer light sources device 20 are parallel to the axes of the gratings 30, and the output directions of the laser beams L can be changed by elements capable of light deflection (not shown). Each light-deflecting element may be a lens provided on one side of the corresponding grating 30 so that the corresponding laser beam L is deflected after passing through the light-deflecting element and the corresponding grating 30. Or each light-deflecting element may be one or a plurality of mirrors configured on one side of the corresponding grating 30 to change the output direction of the corresponding laser beam L.

Figure 9:
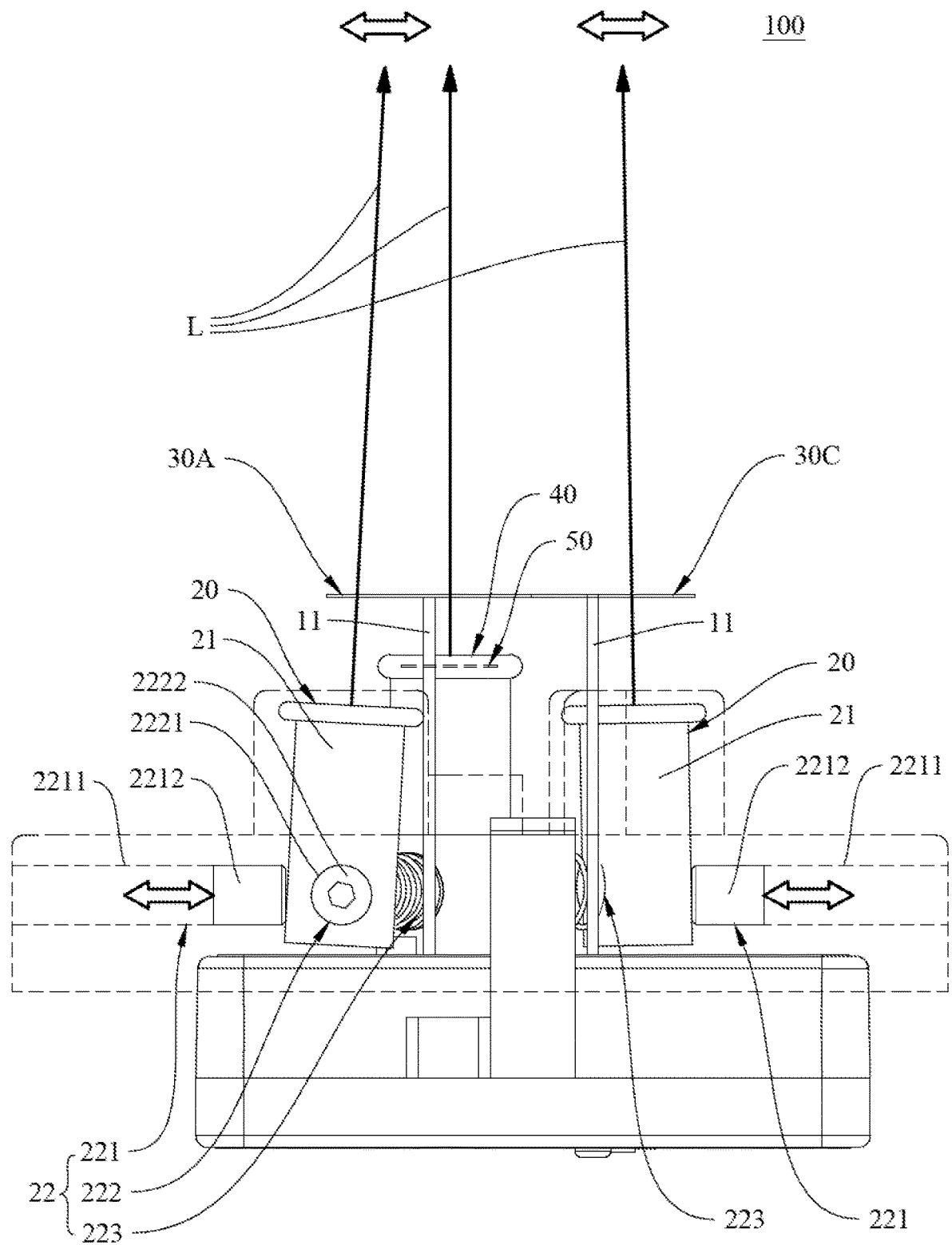
FIG. 9 is the side view of adjusting the laser beams by laser projection clock of the present invention.

In another preferred embodiment as shown in FIG. 9, each of the plurality of the pointer light source devices 20 is tilted toward one side such that the projected laser indications converge at one same point on the projection plane P. Each tilt adjustment unit 22 comprises an X-axis fine-tuning unit 221, a Y-axis fine-tuning unit 222, and one or a plurality of elastic elements 223 configured opposite, and corresponding to an intermediate position between, the X-axis fine-tuning unit 221 and the Y-axis fine-tuning unit 222. Each X-axis fine-tuning unit 221 is configured on a first side of the corresponding laser output unit 21 while the corresponding Y-axis fine-tuning unit 222 is configured on a second side of the corresponding laser output unit 21, wherein the second side forms an included angle with the first side. Each pair of X-axis fine-tuning unit 221 and Y-axis fine-tuning unit 222 are configured for pressing the corresponding elastic elements 223 indirectly, and from different sides respectively, so as to adjust the corresponding laser output unit 21. In one preferred embodiment, the elastic elements 223 are springs or other elements capable of elastic restoration. Please note that the included angle between each pair of X-axis fine-tuning unit 221 and Y-axis fine-tuning unit 222 in the present invention is not necessarily 90° as shown in FIG. 8 and may vary according to design or manufacture requirements; the present invention has no limitation in this regard.

Each X-axis fine-tuning unit 221 comprises a rail 2211 with an internally threaded portion and a threaded locking unit 2212 provided on (or more specifically, threadedly coupled to) the internally threaded portion such that the threaded locking unit 2212 can be moved along the rail 2211 to one end of the rail 2211 in order to press the elastic element 223 on the opposite side of the corresponding laser output unit 21 and thereby adjust the tilt angle of the corresponding laser output unit 21 in the X-axis direction.

Each Y-axis fine-tuning unit 222 is identical in structure to the corresponding X-axis fine-tuning unit 221 and is different from the corresponding X-axis fine-tuning unit 221 only in the direction in which it is provided. Each Y-axis fine-tuning unit 222 comprises a rail 2221 with an internally threaded portion and a threaded locking unit 2222 provided on (or more specifically, threadedly coupled to) the internally threaded portion such that the threaded locking unit 2222 can be moved along the rail 2221 to one end of the rail 2221 in order to press the elastic element 223 on the opposite side of the corresponding laser output unit 21 and thereby adjust the tilt angle of the corresponding laser output unit 21 in the Y-axis direction.

The driving device 10, pointer light sources device 20, and dial light source device 40 in the present invention further have power supply wires (not shown) electrically connected to a power supply in order to be powered for operation.

The laser projection clock of the present invention can be implemented in various ways, two of which are described below with reference to FIGS. 10~11-2 as two preferred embodiments. It is understood, however, that implementation of the present invention is by no means limited to the following embodiments.

Figure 10:
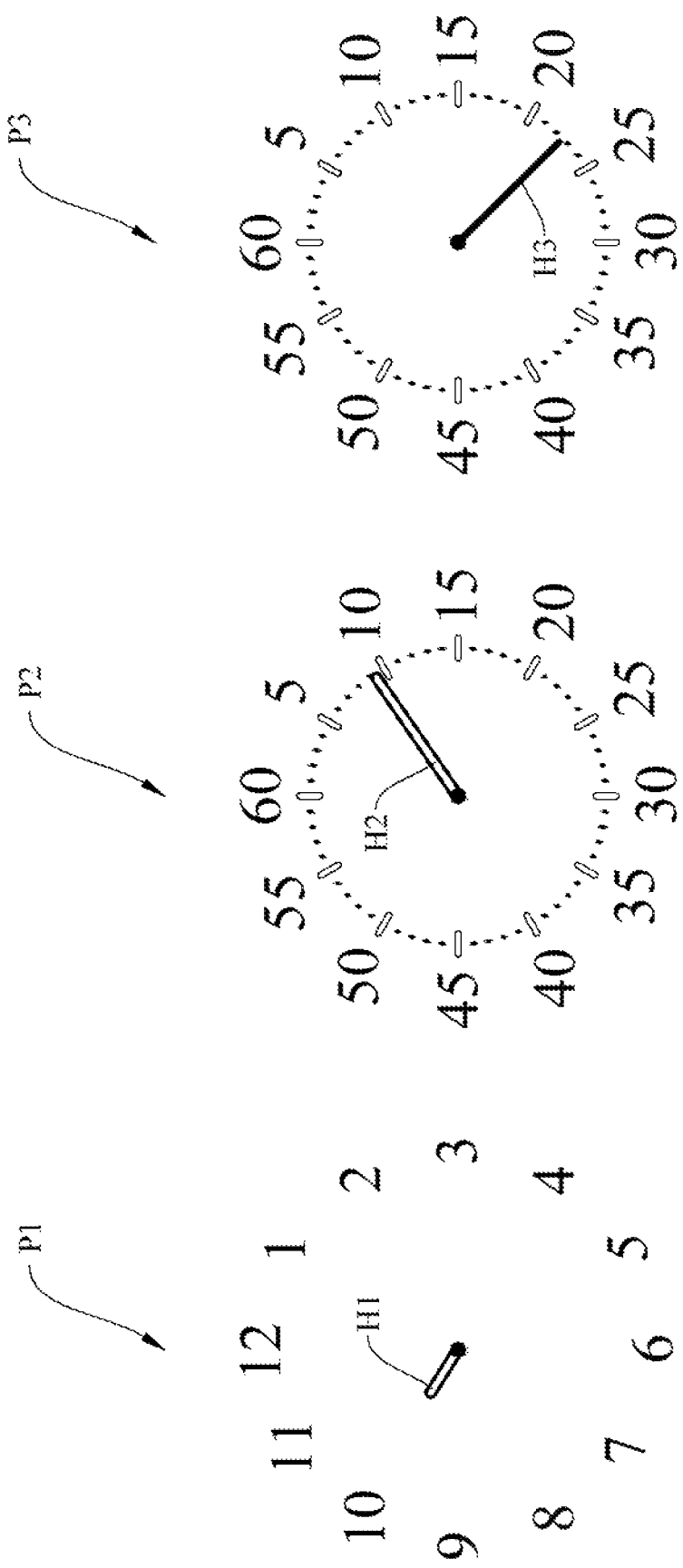
FIG. 10 is the schematic diagram of the laser projection clock of the present invention during the operation.

As shown in FIG. 10, the laser beams L of a plurality of pointer light source devices 20 pass through their respective gratings 30 (i.e., gratings 30A~30C) and are adjusted in output angle by their respective tilt adjustment units 22 such that the resulting laser indications (i.e., the hour hand H1, the minute hand H2, and the second hand H3) are projected on three projection planes P1~P3 respectively. The projection planes P1~P3 lie on one side of the laser projection clock, are arranged from left to right, and have words, numbers, or graduations that indicate the hours, the minutes, and the seconds respectively, allowing the time to be read from the laser indications on the projection planes P1~P3. It should be pointed out that the arrangement of the projection planes P1~P3 is not limited to that described above and may be vertical, annular, or otherwise instead. Furthermore, the projection planes P1~P3 may be physical clock faces, virtual clock faces, or a combination of both; the present invention imposes no limitation on how the projection planes P1~P3 are implemented.

Referring now to FIG. 11-1 and FIG. 11-2, the plurality of the laser indications (i.e., the hour hand H1, the minute hand H2, and the second hand H3) do not meet at one end, i.e., do not converge at one same point on the projection plane P, in the first place. By adjusting the output direction of each laser output unit 21 in the X- and/or Y-axis direction with the corresponding tilt adjustment unit 22, the laser beams L can be fine-tuned until the hour hand H1, the minute hand H2, and the second hand H3 converge at a desired same point on the projection plane P to form the image of a clock that is visually novel and easy to read.

What is claimed is:

1. A laser projection clock, comprising:
a driving device comprising one or a plurality of rotating shafts and a power element for driving the one or a plurality of rotating shafts to rotate at different speeds respectively;
one or a plurality of pointer light source devices configured on one side of the driving device to each output a laser beam, and each of the laser beam's output direction is adjustable; and
one or a plurality of gratings configured on the one or a plurality of rotating shafts in a one-on-one manner in order to be rotated by the one or a plurality of rotating shafts respectively, wherein each said grating has an indication pattern, and the one or a plurality of laser beams are projected to a projection plane which is out of the laser projection clock by penetrating through the one or a plurality of indication patterns of the one or plurality of gratings to form one or a plurality of laser indications respectively, wherein the grating is a diffraction optical element or hologram with a plurality of structures whose width is smaller than one micrometer to produce a diffraction effect when the laser beam passes through the grating, the projection plane is on an opposite side of the gratings to the pointer light source devices, and each of the laser indications is rotated around one or a plurality of points on the projection plane for time displaying.

2. The laser projection clock according to claim 1, wherein the plurality of pointer light source devices tilt toward one side so that the projected laser indications converge at one same point on the projection plane.

3. The laser projection clock according to claim 1, wherein the pointer light source device comprises a laser output unit and a tilt adjustment unit configured on one side of the laser output unit.

4. The laser projection clock according to claim 3, wherein the tilt adjustment unit comprises:
a X-axis fine-tuning unit;
a Y-axis fine-tuning unit; and,
one or a plurality of elastic elements configured opposite, and corresponding to an intermediate position between the X-axis fine-tuning unit and the Y-axis fine-tuning unit;
wherein the X-axis fine-tuning unit is configured on a first side of the laser output unit, the Y-axis fine-tuning unit is configured on a second side of laser output unit forming an included angle with the first side, and the X-axis fine-tuning unit and the Y-axis fine-tuning unit are configured for pressing the elastic element indirectly and from different sides respectively, so as to adjust the laser output unit.

5. The laser projection clock according to claim 4, wherein the X-axis fine-tuning unit comprises a rail with an internally threaded portion and a threaded locking unit threadedly coupled to the internally threaded portion; wherein, the threaded locking unit can be moved along the rail to one end of the rail in order to press the elastic element on an opposite side of the laser output unit and thereby adjust a tilt angle of the laser output unit in the X-axis direction.

6. The laser projection clock according to claim 4, wherein the Y-axis fine-tuning unit comprises a rail with an internally threaded portion and a threaded locking unit threadedly coupled to the internally threaded portion; wherein, the threaded locking unit can be moved along the rail to one end of the rail in order to press the elastic element/elements on an opposite side of the laser output unit and thereby adjust a tilt angle of the corresponding laser output unit in the Y-axis direction.

7. The laser projection clock according to claim 1, further comprises a dial light source device and a fixed grating configured on one side of the dial light source device; wherein a laser beam of the dial light source device is projected through the fixed grating to a projection plane on the dial light source device to form a clock dial pattern.

8. The laser projection clock according to claim 7, wherein the fixed grating has a plurality of annularly arranged identification patterns; and the annularly arranged identification patterns comprise words, numbers, or patterns.

9. The laser projection clock according to claim 1, wherein the driving device is one or a plurality of mechanical movements or quartz movements.

* * * * *